(12) United States Patent  (10) Patent No.: US 9,306,850 B2
Hong et al.  (45) Date of Patent: Apr. 5, 2016

(54) METHOD FOR TRANSMITTING CONTENT IN CONTENT CENTRIC NETWORK (71) Applicants: Choong Seon Hong, Yongin-si (KR); Sung Won Lee, Seongnam-si (KR); Rim Haw, Seoul (KR)

(72) Inventors: Choong Seon Hong, Yongin-si (KR); Sung Won Lee, Seongnam-si (KR); Rim Haw, Seoul (KR)

(73) Assignee: UNIVERSITY-INDUSTRY COOPERATION GROUP OF KYUNG-HEE UNIVERSITY, Gyeonggi-do (KR)

( * ) Notice: Subject to any disclaimer, the term of this patent is extended or adjusted under 35 U.S.C. 154(b) by 0 days.

(21) Appl. No.: 14/433,591

(22) PCT Filed: Oct. 29, 2012

(86) PCT No.: PCT/KR2012/008932
§ 371 (c)(1),
(2) Date: Apr. 3, 2015

(87) PCT Pub. No.: WO2014/054828
PCT Pub. Date: Apr. 10, 2014

(65) Prior Publication Data
US 2015/0229564 A1 Aug. 13, 2015

(30) Foreign Application Priority Data
Oct. 5, 2012 (KR) .................. 10-2012-0110711

(51) Int. Cl.
H04W 4/00 (2009.01)
H04L 12/743 (2013.01)
H04W 40/38 (2009.01)
H04W 40/20 (2009.01)
H04W 40/34 (2009.01)
H04W 60/04 (2009.01)

(52) U.S. Cl.
CPC ........... *H04L 45/7457* (2013.01); *H04W 40/20* (2013.01); *H04W 40/34* (2013.01); *H04W 40/38* (2013.01); *H04W 60/04* (2013.01)

(58) Field of Classification Search
CPC ......... H04L 45/00; H04L 45/22; H04L 45/24; H04L 45/58; H04L 45/74; H04L 45/7457; H04L 49/00; H04W 40/00; H04W 40/02; H04W 40/20; H04W 40/34; H04W 60/00; H04W 60/04
See application file for complete search history.

(56) References Cited

U.S. PATENT DOCUMENTS

| | | | |
|---|---|---|---|
| 2004/0264409 A1 | 12/2004 | Lee et al. | |
| 2009/0288163 A1* | 11/2009 | Jacobson et al. | 726/22 |
| 2010/0157905 A1 | 6/2010 | Ahn et al. | |
| 2013/0111063 A1* | 5/2013 | Lee | 709/241 |
| 2013/0177024 A1* | 7/2013 | Hong et al. | 370/410 |

FOREIGN PATENT DOCUMENTS

| | | |
|---|---|---|
| KR | 10-2010-0023205 A | 3/2010 |
| KR | 10-2012-0060565 A | 6/2012 |

* cited by examiner

*Primary Examiner* — Anh Ngoc Nguyen
(74) *Attorney, Agent, or Firm* — Rabin & Berdo, P.C.

(57) ABSTRACT

A method for transmitting content in a content centric network. The method provides a mobile router with information regarding the content transmission path between a connection router and a mobile terminal while the mobile terminal moves from the current connection router to the mobile router, and enables the mobile router and routers adjacent to the mobile router to transmit a content request message only to the path router included in the transmission path from among the adjacent routers based on the transmission path information, thus reducing loads to a network and quickly transmitting a request content to the mobile terminal.

13 Claims, 11 Drawing Sheets

METHOD FOR TRANSMITTING CONTENT IN CONTENT CENTRIC NETWORK

TECHNICAL FIELD

The present invention relates to a method for transmitting a content in a content-centric network, and more particularly, to a method for providing a mobile router with information regarding a content transmission path between an access router and a mobile terminal while the mobile terminal moves from the current access router to the mobile router, and enabling the mobile router and routers adjacent to the mobile router to transmit a content request message only to the router included in the transmission path from among the adjacent routers based on the transmission path information, thereby reducing loads in a network and rapidly transmitting a requested content to the mobile terminal.

The method of the present invention was implemented under the research management and supervision by National IT Industry Promotion Agency with the support of Ministry of Knowledge Economy (MKE) (Project No. NIPA-2012-(H0301-12-2001) of Information Telecommunication Research Center).

BACKGROUND ART

The Internet widely used so far is a network constructed such that a service is requested and is provided in a one-to-one scheme between a sender and a receiver using the IP address. However, the use of the Internet has been continuously developed in a wide range of fields such as Internet high-definition TVs, Internet audio/video communications, Internet remote controls, Internet of Things (IoT) and the like. In reality, the Internet employing the one-to-one scheme has a limitation in scalability, security, service quality assurance due to the depletion of the IP address sapce.

A study is in progress on the future Internet to overcome the limitation of the Internet. The study on the future Internet can be based on an evolutionary approach and a revolutionary approach. The key aspect of the evolutionary approach is that the basic characteristic of the Internet is currently maintained as it is while service continuity is ensured and the improvement of the service is pursued. On the other hand, the key aspect of the revolutionary approach is that a network technology is created to fully meet the needs of a future society without being bounded or restricted by the current Internet technology.

Content-centric network (CCN) in the future Internet research is a new networking concept that the service is requested and provided based on a content name rather than a concept of requesting and providing the service in a one-to-one manner using the conventional IP address.

Figure 1:
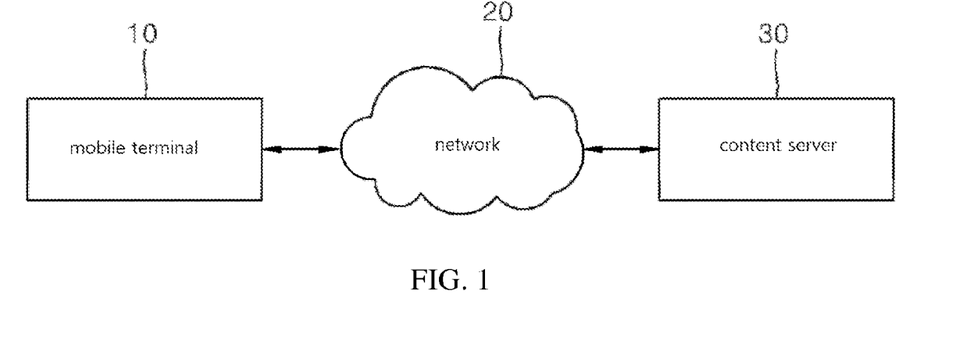
FIG. 1 is a functional block diagram illustrating a conventional content-centric network in accordance with the prior art.
Figure 2:
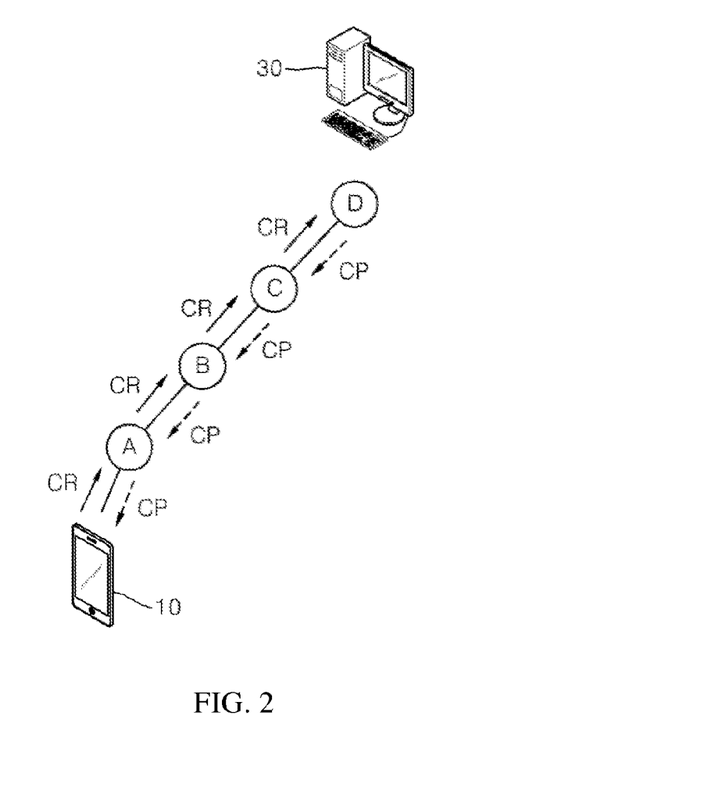
FIG. 2 is a functional block diagram illustrating a process in which a content is transmitted and received in the conventional content-centric network.
Figure 3:
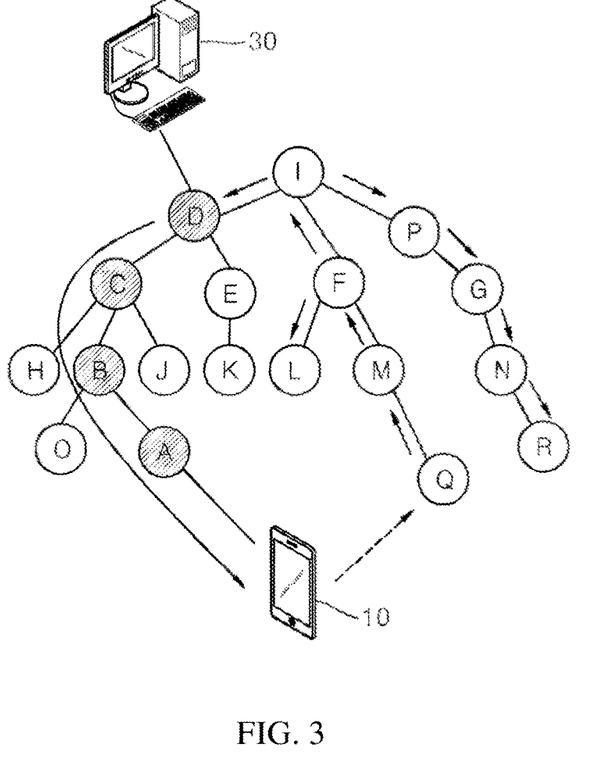
FIG. 3 is a functional block diagram illustrating a process of transmitting a content when a router to which a mobile terminal has access is changed in the conventional content-centric network.

FIG. 1 is a functional block diagram illustrating a conventional content-centric network in accordance with the prior art, FIG. 2 is a functional block diagram illustrating a process in which a content is transmitted and received in the conventional content-centric network, and FIG. 3 is a functional block diagram illustrating a process of transmitting a content when a router to which a mobile terminal has access is changed in the conventional content-centric network.

A conventional content-centric network will be described in more detail hereinafter with reference to FIG. 1.

The conventional content-centric network includes a network 20 including a plurality of routers, a mobile terminal 10 connected to the network 20, and a content server 30.

The mobile terminal 10 is moved, and has access to any one of the plurality of routers included in the network 20 and transmits a content request message to the access router. The access router extracts an identifier of the requested content from the content request message and determines whether or not the requested content is stored and registered in the access router based on the identifier of the requested content. If it is determined that the requested content does not exist in the access router, the access router transmits the content request message to adjacent routers of the network 20 in a flooding manner. An adjacent router that has the requested content stored and registered therein among the adjacent routers or a source router that has access to the content server 30 providing the requested content transmits the requested content to the mobile terminal 10 in a reverse order to an order in which the request content message is transmitted.

Referring to FIG. 2, more specifically, the mobile terminal 10 transmits a content request message CR including an identifier of the requested content to an access router A if the requested content exists. The access router A compares the identifier of the requested content with a list of contents stored and registered in the access router A and determines whether or not the requested content exists in the access router A. If the requested content does not exist in the access router A, the access router A transmits the content request message to an adjacent router B, which in turn determines whether or not the requested content exists in the access router B in the same manner as in the access router A. If the requested content does not exist in the access router B, the access router B transmits the content request message to an adjacent router C of the adjacent router B. Then, the adjacent router C transmits the content request message to an adjacent router D thereof. The adjacent routers D is a source router that has access to the content server 30 providing the requested content. The source router D transmits a content response message CP including the requested content to the adjacent router C that has received the content request message. The adjacent router C maps the requested content included in the content response message CP to the identifier of the requested content and stores and registers the mapped content in the adjacent router C. Then, the adjacent router C transmits the content response message CP to the adjacent router B that has received the content request message. Then, the adjacent router B stores and registers the requested content therein in the same manner as in the adjacent router C and transmits the content response message to the access router A. Then, the access router A stores and registers the requested content of the content response message and transmits the requested content to the mobile terminal 10.

Meanwhile, a process of transmitting a content when a mobile terminal is moved and an access router of the mobile terminal is changed will be described in more detail hereinafter with reference with FIG. 3.

When the mobile terminal 10 has access to a router Q while moving during the reception of the requested content from a current access router A, the access of the mobile terminal 10 to the access router A is interrupted and the mobile terminal 10 has access to the new access router Q at a position where the mobile terminal 10 is moved. When the mobile terminal 10 connects to the new access router Q, it transmits the content request message to the new access router Q in order to continuously receive the requested content. Then, the new access router Q determines whether or not the requested content exists in the new access router Q based on the identifier of the requested content included in the content request message. If it is determined that the requested content does not exist in the new access router Q, the new access router Q transmits the content request message to adjacent routers sequentially in a flooding manner. An adjacent router I that has received the content request message transmits the content request message to adjacent routers D and P, respectively. The adjacent router D of the adjacent routers D and P is a path router included in a content transmission path before the mobile terminal is moved, thus has the requested content stored and registered therein. The path router D transmits a content response message including the requested content to the adjacent router I that has received the content request message, and transmits the content response message to adjacent routers that are present in the transmission path of the content request message in a reverse order to an order in which the content request message is transmitted.

However, if the requested content does not exist in the adjacent router P of the adjacent routers D and P, the adjacent router P continues to transmit the content request message to adjacent routers thereof until an adjacent router having the requested content stored and registered therein is retrieved.

DISCLOSURE OF INVENTION

Technical Problem

The aforementioned conventional method for transmitting a content in the content-centric network determines whether or not the requested content exists in a certain router based on the routers. Thus, if the requested content does not exist in the certain router, the certain router transmits the content request message including the requested content to all the adjacent routers in a flooding manner. Thus, even if an adjacent router having the requested content stored and registered therein is present in the adjacent routers, the certain router transmits the content request message to all the adjacent routers, thus leading to an overload in the network.

Moreover, in the conventional content-centric network, when a mobile terminal has access to a new access router while moving during the reception of the requested content from an access router, it newly transmits a content request message including the requested content to the new access router to receive the requested content from the new access router, thus causing a problem in that a long time delay occurs when the mobile terminal receives the requested content. In addition, in the case where the mobile terminal receives the requested content from the new access router, the requested content that has been previously received is ignored. For this reason, a long time delay and an overload occur in the network when the mobile terminal receives the requested content due to duplicate reception and storage of the requested content.

Accordingly, the present invention has been made to solve the above-mentioned problems occurring in the conventional content-centric network, and it is an object of the present invention to provide a content transmission method in which when a path router corresponding to a content transmission path is present in adjacent routers after the movement of a mobile terminal based on information regarding the content transmission path before the movement of the mobile terminal, a content request message is transmitted to only the path router, thereby preventing an overload from occurring in the network.

Another object of the present invention is to provide a content transmission method in which a mobile terminal can promptly receive only a content that has not been transmitted to the mobile terminal even after the movement of the mobile terminal through a content division identifier of a content that has been transmitted by an access router before the movement of the mobile terminal.

Still another object of the present invention is to provide a content transmission method in which a mobile terminal can receive a content through a communication interface having the highest data rate among a plurality of communication interfaces included in the mobile terminal.

Technical Solution

To achieve the above objects, in accordance with one embodiment of the present invention, there is provided a method of transmitting a content to a mobile node in a content-centric network including the mobile node and a plurality of routers, the method comprising the steps of: allowing, if the mobile node has access to a mobile router of the plurality of routers, a transmission management agent included in the content-centric network to receive an access registration message from the mobile router; allowing the transmission management agent to determine whether or not the mobile node is moved from an access router to which the mobile node has access to the mobile router based on a mobile node identifier, a mobile router identifier, and a communication interface identifier of the mobile node, which are included in the access registration message; and allowing, if the mobile node is moved from the access router to the mobile router, the transmission management agent to transmit information regarding a content transmission path between the mobile node and a source router of a source server providing the content to the mobile node.

In the content transmission method in accordance with the present invention, the step of allowing determining whether or not the mobile node is moved from the access router to the mobile router may include the steps of: determining whether or not the mobile node has access to the access router based on whether or not a mobile node identifier that is the same as the mobile node identifier is previously stored and registered in a management database of the transmission management agent; comparing, if it is determined that mobile node has access to the access router, an identifier of a communication interface between the mobile node and the access router with an identifier of a communication interface between the mobile node and the mobile router; and determining, if it is determined that the identifier of a communication interface between the mobile node and the access router is different from the identifier of a communication interface between the mobile node and the mobile router, that the mobile node is moved from access router to the mobile router.

In the content transmission method in accordance with the present invention, the transmission management agent may receive information regarding a content transmission path between the mobile node and the source router form the access router, and store and register the mobile node identifier, the mobile router identifier, the communication interface identifier of the mobile node, and the information regarding the content transmission path, which are included in the access registration message, in the management database.

In the content transmission method in accordance with the present invention, the mobile node that has received the information regarding the content transmission path may transmit a content request message including the information regarding the content transmission path to the mobile router, and the mobile router or an adjacent router of the mobile router may determine whether or not a path router included in the transmission path is present in an adjacent router of the mobile router or adjacent routers of the adjacent router based on the transmission path information.

Preferably, if a plurality of adjacent routers is present in the mobile router or the adjacent router, the mobile router or the adjacent router may transmit the content request message to the path router included in the transmission path of the plurality of adjacent routers based on the transmission path information.

To achieve the above objects, in accordance with another embodiment of the present invention, there is provided a method of transmitting a content to a mobile node in a content-centric network, the method comprising the steps of: (a) allowing a transmission management agent to determine whether or not the mobile node is moved from an access router to a mobile router, and transmit information regarding a content transmission path between the mobile node and a source router providing the content to the mobile node; (b) allowing the mobile node to transmit information regarding the content transmission path and a content request message including an identifier of the requested content to the mobile router; and (c) allowing the mobile router to determine whether or not a path router included in the content transmission path is present in the adjacent routers of the mobile router based on the information regarding the content transmission path, and re-transmit the content request message to the path router.

In the content transmission method in accordance with the present invention, the step of re-transmitting the content request message may include the steps of: allowing the mobile router to determine whether or not the requested content exists in a registration content list of the access router based on the identifier of the requested content included in the content request message; and allowing, if it is determined that the requested content does not exist in a registration content list of the access router, the mobile router to determine whether or not a path router included in the content transmission path is present in the adjacent routers of the mobile router based on the information regarding the content transmission path; and allowing, if it is determined that the path router included in the content transmission path is present in the adjacent routers of the mobile router, the mobile router to re-transmit the content request message to the path router.

In the content transmission method in accordance with the present invention, if it is determined that the path router included in the content transmission path is not present in the adjacent routers of the mobile router, the mobile router may re-transmit the content request message to all the adjacent routers of the mobile router.

In the content transmission method in accordance with the present invention, the adjacent routers that have received the content request message may perform the steps of: determining whether or not the requested content exists in a registration content list of the adjacent routers based on the identifier of the requested content included in the content request message; determining, if it is determined that requested content does not exist in the registration content list, whether or not a path router included in the content transmission path is present in second adjacent routers of the adjacent router based on the information regarding the content transmission path; and re-transmitting, if it is determined that the path router included in the content transmission path is present in the second adjacent routers, the content request message to the path router, and re-transmitting, if it is determined that the path router included in the content transmission path is not present in the second adjacent routers, the content request message to all the second adjacent routers of the adjacent router.

In the content transmission method in accordance with the present invention, the mobile node may select a communication interface having the highest data rate from among the communication interfaces between the mobile node and the mobile router, and transmis the content request message to the mobile router through the selected communication interface or receives a content response message including the requested content from the mobile router.

Preferably, the mobile node may select a communication interface with the highest signal intensity as a communication interface having the highest data rate based on the signal intensities of the respective communication interfaces between the mobile node and the mobile router.

Preferably, the content request message may include a division identifier of a content that has been transmitted to the mobile node, and the path router included in the content transmission path may transmit the content to the mobile terminal through the mobile router, starting from a content corresponding to a previous division identifier of the content based on the content division identifier.

Advantageous Effects

The content transmission method in the content-centric network in accordance with the present invention as constructed above have the following various advantageous effects over the conventional method.

First, in the content transmission method in accordance with the present invention, when a path router corresponding to a content transmission path is present in adjacent routers after the movement of a mobile terminal based on information regarding the content transmission path before the movement of the mobile terminal, a content request message is transmitted to only the path router, thereby preventing an overload from occurring in the network.

Second, the content transmission method in accordance with the present invention enables a mobile terminal to receive only a content that has not been transmitted to the mobile terminal even after the movement of the mobile terminal through a content division identifier of a content that has been transmitted by an access router before the movement of the mobile terminal so that the mobile terminal can promptly receive the requested content without being delayed.

Third, the content transmission method in accordance with the present invention determines a transmission path where the requested content is to be transmitted through a new access router during the movement of a mobile terminal so that after the mobile terminal is moved, it can promptly receive the requested content.

Fourth, the content transmission method in accordance with the present invention enables a mobile terminal to receive a content through a communication interface having the highest data rate among a plurality of communication interfaces included in the mobile terminal so that the mobile terminal can promptly receive the requested content adaptively depending on the communication state.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Now, a method in accordance with an embodiment of the present invention will be described hereinafter in detail with reference to the accompanying drawings.

Figure 4:
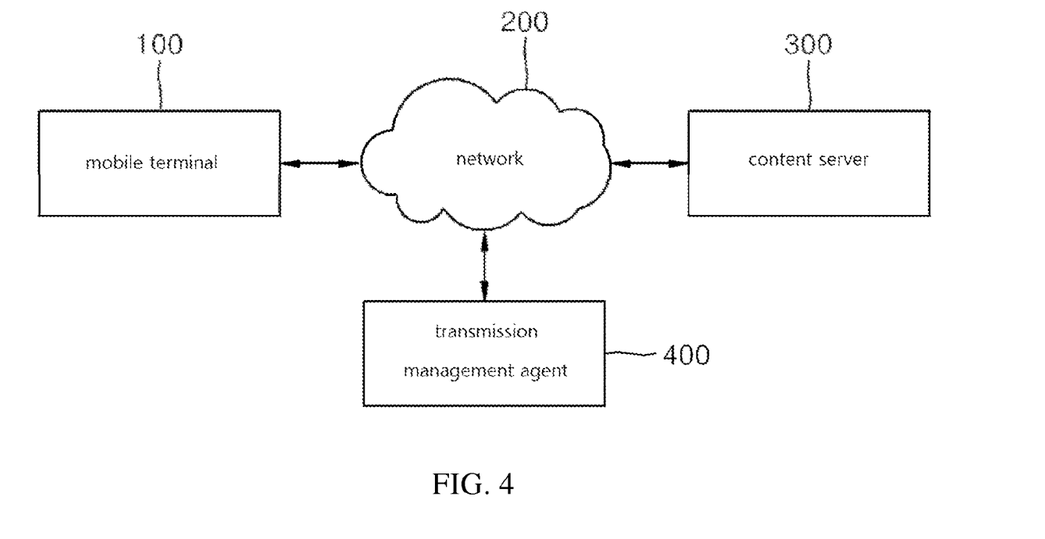
FIG. 4 is a functional block diagram illustrating a conventional content-centric network in accordance with the present invention.
Figure 5:
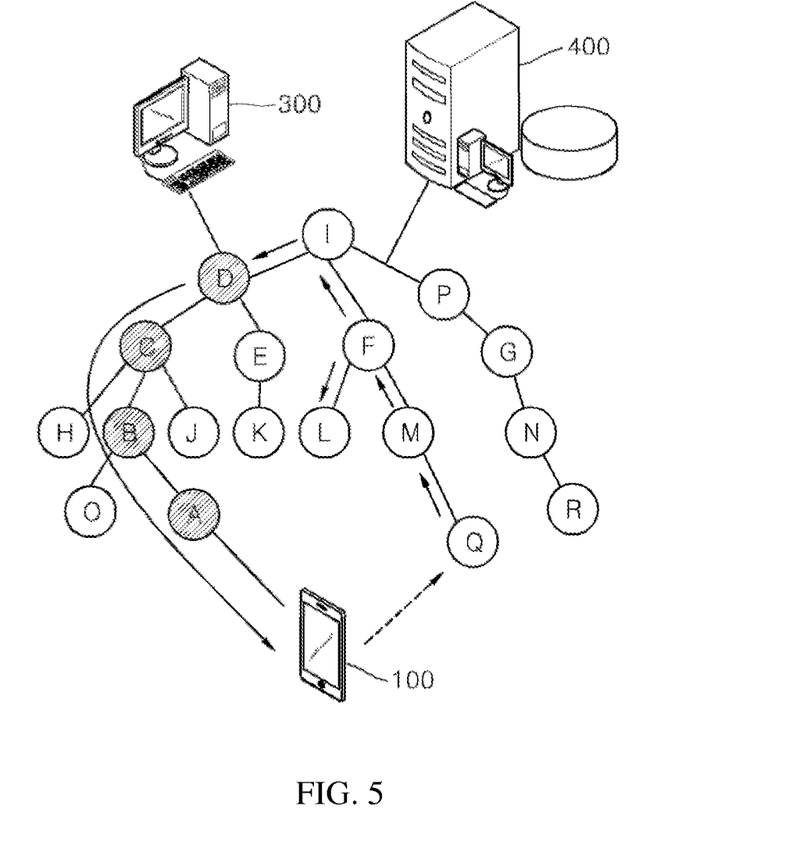
FIG. 5 is a process of transmitting a content when a router to which a mobile terminal has access is changed in a content-centric network in accordance with the present invention.

FIG. 4 is a functional block diagram illustrating a conventional content-centric network in accordance with the present invention, and FIG. 5 is a process of transmitting a content when a router to which a mobile terminal has access is changed in a content-centric network in accordance with the present invention.

A content-centric network in accordance with the present invention will be described in more detail hereinafter with reference to FIG. 4.

The content-centric network in accordance with the present invention includes a network 200 including a plurality of routers, a mobile terminal 100 connected to the network 200, a content server 300, and a transmission management agent 400.

The mobile terminal 100 has access to any one of the plurality of routers included in the network 200, and the accesss router transmits access information of the mobile terminal 100 and the access router, for example, a registration message including a mobile terminal identifier, an access router identifier, and information regarding a communication interface between the mobile terminal 100 and the access router, and the like to the transmission management agent 400. On the other hand, the mobile terminal 100 transmits a content request message for requesting a content to the access router. The access router extracts an identifier of the requested content from the content request message and determines wheter or not the requested content is stored and registered in the access router based on the identifier of the requested content. If it is determined that the requested content does not exist in the accesss router, the access router transmits the content request message to adjacent routers of the network 200 in a flooding manner. An adjacent router that has the requested content stored and registered therein among the adjacent routers or a source router that has access to the content server 300 providing the requested content transmits the requested content to the mobile terminal 100 in a reverse order to an order in which the request content message is transmitted.

More specifically, the mobile terminal 100 transmits a content request message including an identifier of the requested content to an access router if the requested content exists. The access router compares the identifier of the requested content with a list of contents stored and registered in the access router and determines whether or not the requested content exists in the access router. If the requested content does not exist in the access router, the access router transmits the content request message to an adjacent router, which in turn determines whether or not the requested content exists in the access router in the same manner as in the access router. If the requested content does not exist in the access router, the access router transmits the content request message to an adjacent router of the adjacent router. The content request message is transmitted to a source router until a source router having the requested content stored and registered therein is retrieved.

The source router having the requested content stored and registered therein transmits a content response message including the requested content to the adjacent router that has received the content request message. The adjacent router maps the requested content included in the content response message to the identifier of the requested content and stores and registers the mapped content therein. Then, the adjacent router sequentially transmits the content response message to other adjacent routers that have received the content request message. The access router that has received the content response message transmits the requested content to the mobile terminal 100. In the content-centric network in accordance with the present invention, the access router receives the requested content from the source router through a transmission path of the content response message. Then, the access router transmits information regarding the content transmission path to the transmission management agent 400. The transmission management agent 400 stores and registers information regarding the content transmission path in a management database.

Meanwhile, a process of transmitting a content when a mobile terminal is moved and an access router of the mobile terminal is changed in the content-centric network in accordance with the present invention will be described in more detail hereinafter with reference with FIG. 5.

When the mobile terminal 100 has access to a mobile router Q while moving during the reception of the requested content from a current access router A, the access of the mobile terminal 100 to the access router A is maintained and the mobile terminal 100 transmits a registration message to the mobile router Q at a position where the mobile terminal 100 is moved. Then, the mobile router Q transmits, an access registration message including a mobile terminal identifier, a mobile router identifier, and information regarding a communication interface between the mobile terminal and the mobile router, to the transmission management agent 400 in response to the registration message. The transmission management agent 400 determines that the mobile terminal 100 is changing the access target from the access router A to the mobile router Q, and transmits information regarding the content transmission path to the mobile terminal 100.

The mobile terminal 100 transmits a content request message including the transmission path information, the identifier of the requested content, and the like to the mobile router Q. The mobile router Q determines whether or not the requested content exists in the mobile router Q based on the identifier of the requested content of the content request message. If it is determined that the requested content does not exist in the mobile router Q, the mobile router Q determines whether or not a path router corresponding to the transmission path is present in adjacent routers of the mobile router Q.

If it is determined the path router is not present in the adjacent routers, the mobile router Q transmits the content request message to all the adjacent routers in a flooding manner. An adjacent router M and adjacent routers F and L, which have received the content request message from the mobile router Q, determine whether or not the requested content is respectively stored and registered therein in the same manner as the transmission manner of the content request message by the mobile router Q as described above. If it is determined that the requested content in the adjacent routers M, F and L, the adjacent routers determine whether or not a path router is present in adjacent routers. If it is determined that path router is not present in the adjacent routers, the adjacent routers transmit the content request message to all the adjacent routers in a flooding manner.

In the meantime, an adjacent router I that has received the content request message from the adjacent router F determines whether or not the path router is present in adjacent routers D and P, and determines that adjacent router D is the path router included in a transmission path before movement of the mobile terminal. The adjacent router I transmits the content request message to only the adjacent router D corresponding to the path router. The adjacent router D that has reveived the content request message transmits the content response message including the requested content, which is stored and registered therein, to the adjacent router I that has received the content request message. Then, the adjacent router I transmits the content response message to the adjacent routers that are present in the transmission path of the content request message in a reverse order to an order in which the content request message is transmitted.

In the case where the mobile terminal is moved to cause the access router to be changed in the content-centric network in accordance with the present invention, the content request message is transmitted to only the adjacent routers included in the content transmission path based on the content transmission path so that a communication overload is prevented from occurring in the network. In addition, the determination of the source router D having the requested content stored and registered therein and the content transmission path between the mobile router Q and the source router D during the movement of the mobile terminal 100 enables the mobile terminal 100 to promptly receive the requested content.

Figure 6:
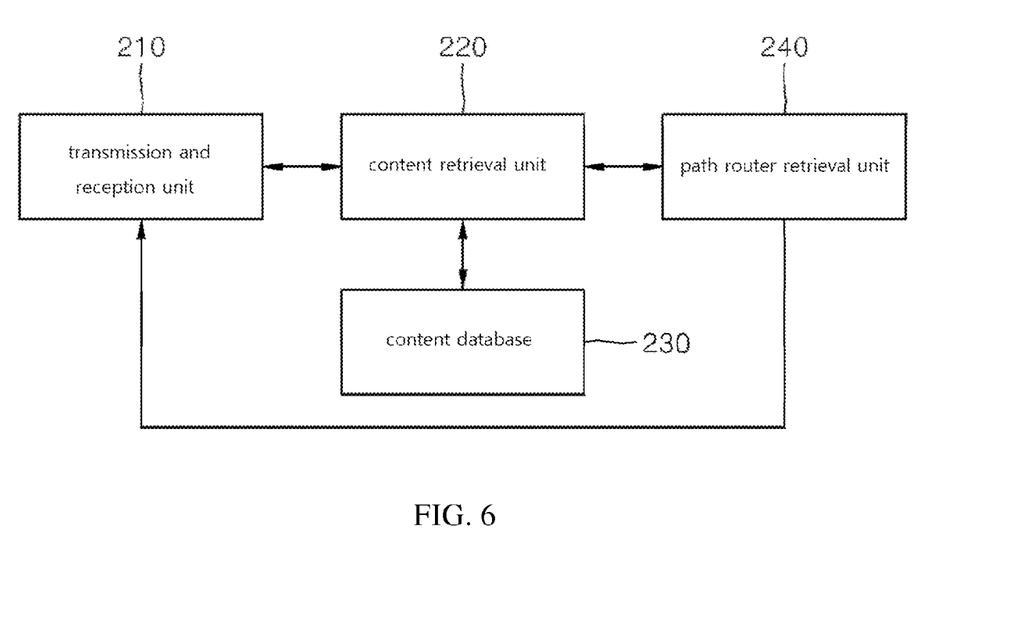
FIG. 6 is a functional block diagram illustrating a router of a content-centric network in accordance with the present invention.

FIG. 6 is a functional block diagram illustrating a router of a content-centric network in accordance with the present invention.

Referring to FIG. 6, more specifically, the router performs a function of transmitting and receiving a message or content in the network 200. A transmission and reception unit 210 receives the content request message including an identifier of the requested content and information regarding a content transmission path. In addition, a content retrieval unit 220 compares the identifier of the requested content of the content request message with a content identifier stored in a content database 230, and then determines whether or not the requested content is stored and registered in the content database 230 of the router based on a result of the comparison. If it is determined that the requested content is stored and registered in the content database 230, the content retrieval unit 220 extracts the requested content from the content database 230 and transmits the extracted requested content to adjacent routers in the transmission path of the content request message through the transmission and reception unit 210. Preferably, the content retrieval unit 220 extracts a content division identifier of the content request message, and extracts a content based on the extracted content division identifier to transmit the extracted content to adjacent routers in the transmission path of the content request message through the transmission and reception unit 210. More preferably, the content retrieval unit 220 extracts the content division identifier of the content request message, and extracts a content correspond to a content division identifier prior to the content division identifier based on the extracted content division identifier to transmit the extracted content to adjacent routers in the transmission path of the content request message through the transmission and reception unit 210.

If the requested content is not stored and registered in the content database 230, a path router retrieval unit 240 determines whether or not a path router, i.e., an adjacent router included in the transmission path is present in the adjacent routers. If it is determined that the path router is present in the adjacent routers, the path router retrieval unit 240 controls the content request message to be transmitted to only the path router through the transmission and reception unit 210. On the contrary, if it is determined that the path router is not present in the adjacent routers, the path router retrieval unit 240 controls the content request message to be transmitted to all the adjacent routers in a flooding manner.

In the meantime, if the content retrieval unit 220 receives a content response message including the requested content stored therein through the transmission and reception unit 210, it determines whether or not the requested content is stored and registered in the content database 230. If it is determined that the requested content is not stored and registered in the content database 230, the content retrieval unit 220 stores and registers the requested content in the content database 230.

Figure 7:
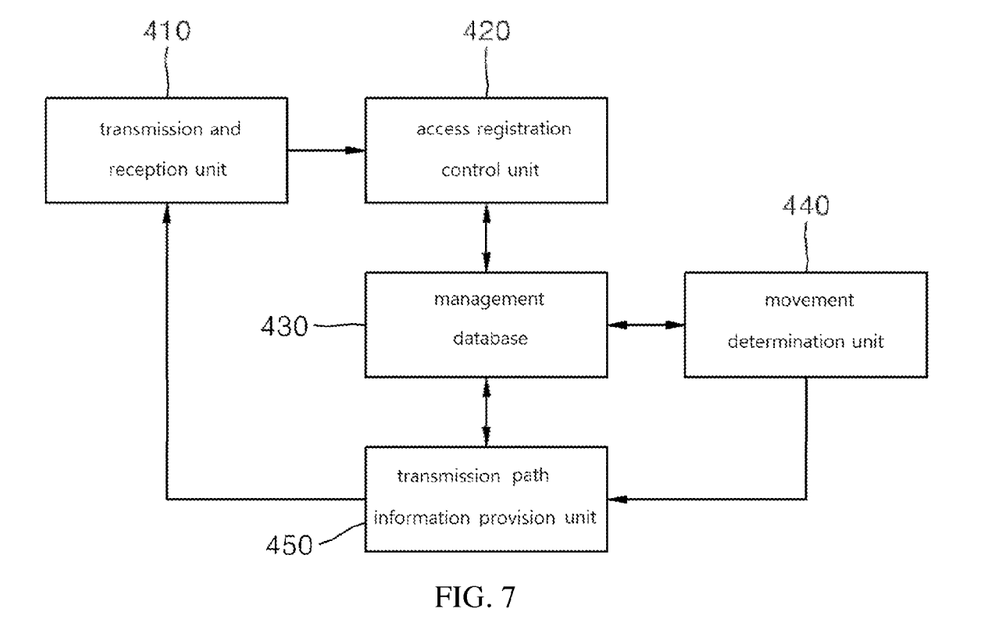
FIG. 7 is a functional block diagram illustrating a transmission management agent in accordance with the present invention.

FIG. 7 is a functional block diagram illustrating a transmission management agent in accordance with the present invention;

Referring to FIG. 7, more specifically, when a mobile terminal has access to a router, a transmission and reception unit 410 receives an access registration message from the access router. A access registration control unit 420 stores and registers a mobile terminal identifier, an access router identifier, and information regarding a communication interface between the mobile terminal and the access router communication interface between the mobile terminal and the access router, which are included in the access registration message, in a management database 430.

A movement determination unit 440 determines whether or not a mobile terminal and a mobile having the same identifier are stored and registered in the management database 430. If it is determined that a mobile terminal and a mobile having the same identifier are stored and registered in the management database 430, the movement determination unit 440 compares the communication interface between the mobile terminal and the access router with a communication interface of a mobile terminal having the same identifier that is previously stored and registered in the management database 430. The movement determination unit 440 determines that a mobile terminal is moving if a mobile terminal and a mobile having the same identifier are stored and registered in the management database 430 through different communication interfaces.

If it is determined that a mobile terminal is moving, a transmission path information provision unit 450 receives a path registration message from an access router before the movement of the mobile terminal, and extracts information regarding a content transmission path that is previously stored and registered in the management database 430. Then, the transmission path information provision unit 450 controls the information regarding the content transmission path to be transmitted to the mobile terminal through the transmission and reception unit 410.

Figure 8:
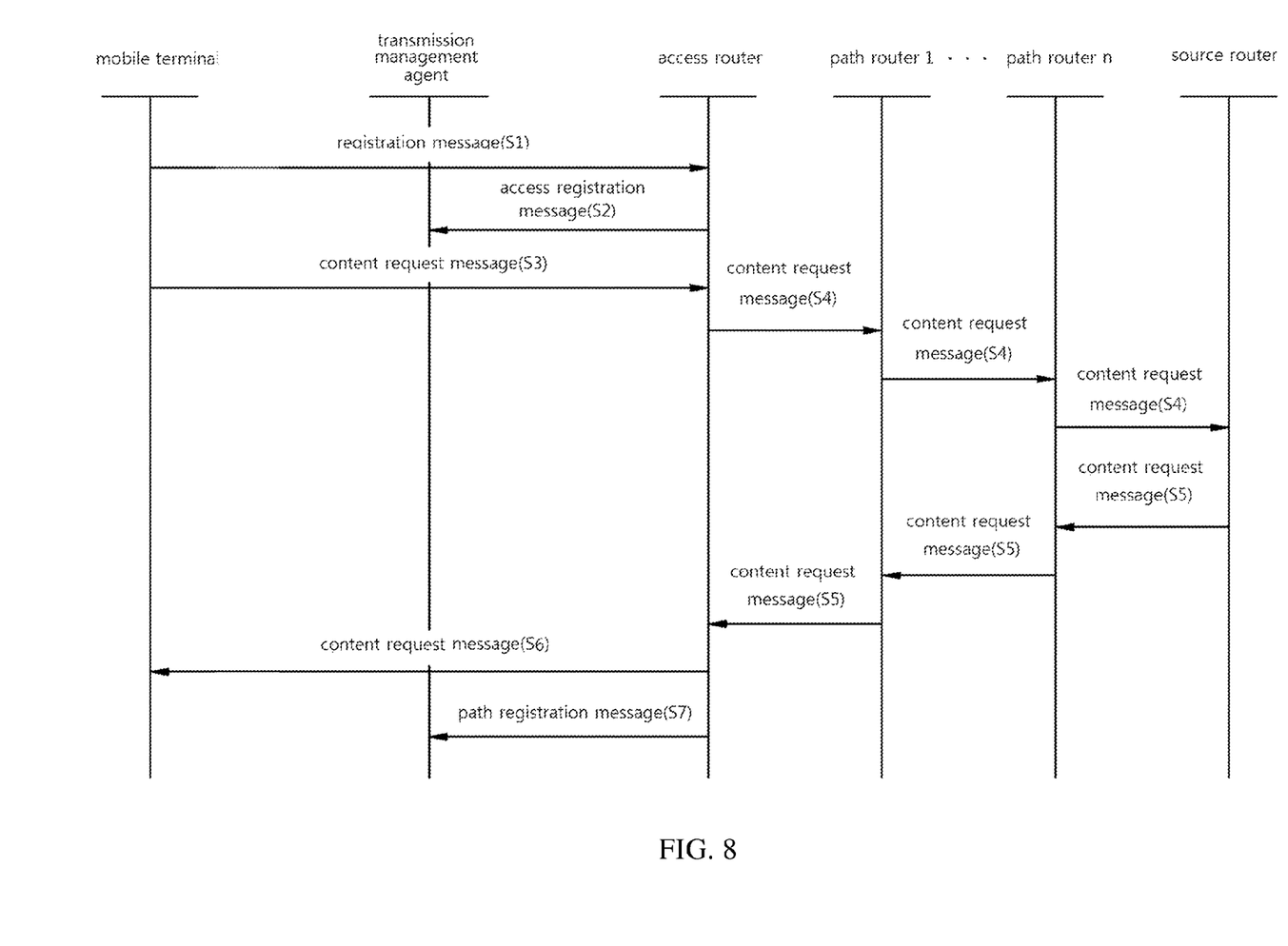
FIG. 8 is a flow diagram illustrating a procedure in which a message is transmitted and received so that a mobile terminal receives a content in the content-centric network in accordance with the present invention.

FIG. 8 is a flow diagram illustrating a procedure in which a message is transmitted and received so that a mobile terminal receives a content in the content-centric network in accordance with the present invention.

Referring to FIG. 8, more specifically, when a mobile terminal has access to a router, it transmits a registration message for registering its access to the access router to the access router (S1). The registration message includes a mobile terminal identifier, a communication interface identifier and the like. The access router receives the access router from the mobile terminal, it transmits a access registration message including a mobile terminal identifier, an access router identifier, and information regarding a communication interface between the mobile terminal and the access router to the transmission management agent (S2).

In the meantime, in the case where the mobile terminal desires to request a content, it transmits a content request message including an identifier of the requested content to the access router (S3). Then, the accesss router determines whether or not the requested content is stored and registered in the access router based on the identifier of the requested content included in the content request message. If it is determined that requested content is not stored and registered in the access router, the access router sequentially transmits the content request message to path routers, i.e., adjacent routers having the requested content stored and registered therein (S4). If a source router having the requested content stored and registered therein receives the content request message, it generates a content response message including the requested content and transmits the generated content response message to the adjacent routers and the access router in a reverse order to an order in which the content request message is transmitted (S5). The access router that has received the content response message transmits the received content response message to the mobile router (S6). On the other hand, the access router transmits information regarding the content transmission path to the transmission management agent based on the reception path of the content response message (S7).

Figure 9:
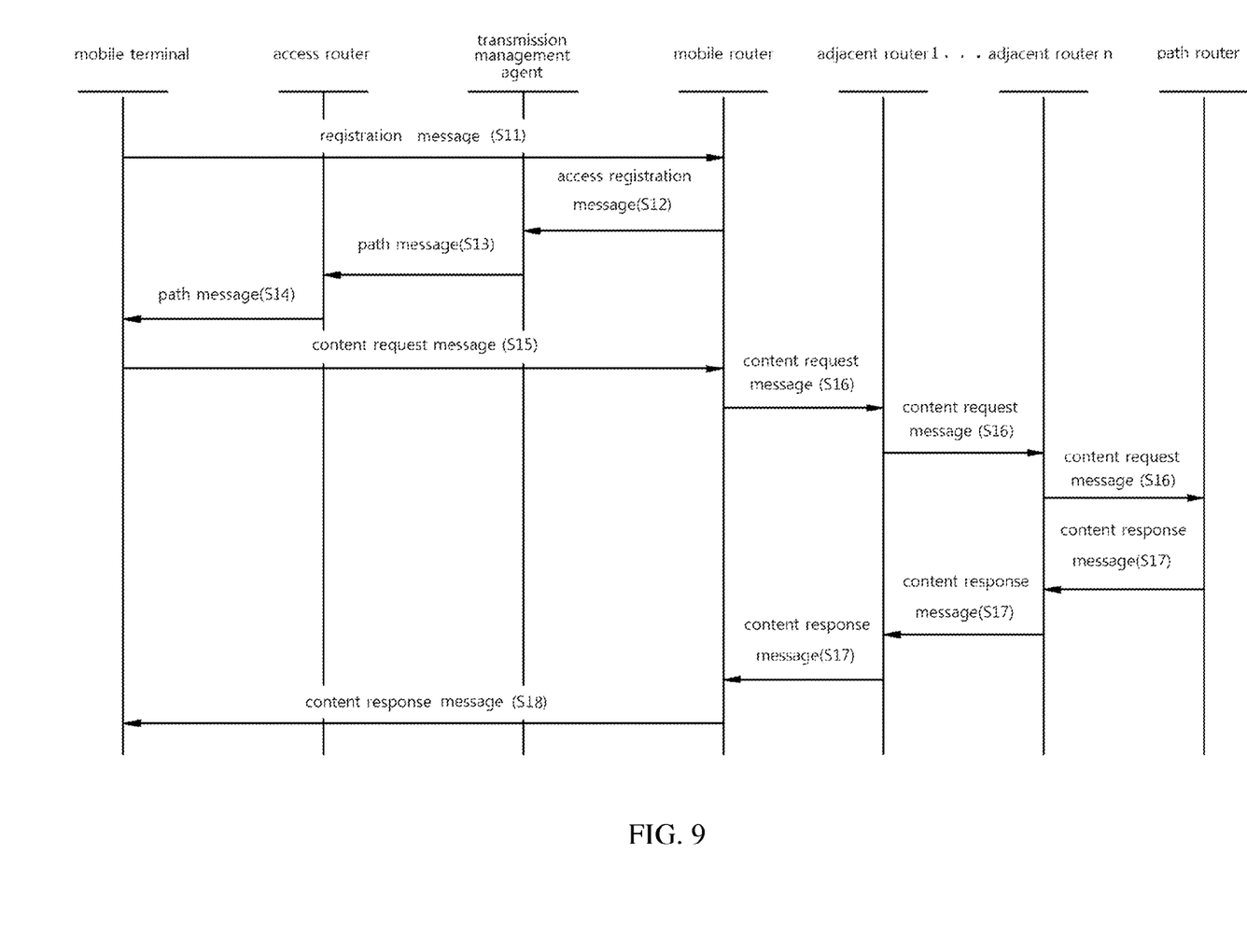
FIG. 9 is a flow diagram illustrating a procedure in which a message is transmitted and received so that a mobile terminal receives a content from a router to which the mobile terminal has access when the mobile terminal is moved in the content-centric network in accordance with the present invention.

FIG. 9 is a flow diagram illustrating a procedure in which a message is transmitted and received so that a mobile terminal receives a content from a router to which the mobile terminal has access when the mobile terminal is moved in the content-centric network in accordance with the present invention.

Referring to FIG. 9, more specifically, the mobile terminal transmits a registration message including a mobile terminal identifier and a communication interface identifier to a mobile router to which the mobile terminal has access during the movement thereof so as to register its access to the mobile router (S11). If the mobile router receives the registration message from the mobile terminal, it transmits an access registration message including a mobile terminal identifier, a mobile router identifier, and information regarding a communication interface between the mobile terminal and the mobile router to the transmission management agent (S12). The transmission management agent determines whether or not that the mobile is moving based on the access registration message and registration information that is previously registered in the transmission management agent. If it is determined that the mobile is moving, the transmission management agent transmits a path message including information regarding a content transmission path of the mobile terminal to the access router (S13), and the access router transmits the path message to the mobile terminal (S14). Herein, information regarding the content transmission path is stored in the transmission management agent and means information regarding the transmission path through which a content is transmitted to the mobile terminal from the access router before the movement of the mobile terminal.

The mobile terminal generates a content request message including an identifier of the requested content, information regarding a content transmission path, and content division identifier information and transmits the generated content request message to the mobile router (S15). The mobile router determines whether or not the requested content is stored and registered in the mobile router based on the identifier of the requested content included in the content request message. If it is determined that requested content is not stored and registered in the mobile router, the mobile router sequentially transmits the content request message to adjacent routers on the preferential basis of the path router included in the transmission path among adjacent routers based on information regarding the content transmission path (S16). If a source router having the requested content stored and registered therein receives the content request message from the mobile router, it generates a content response message including the requested content and transmits the generated content response message to the adjacent routers and the mobile router in a reverse order in which the content request message is transmitted(S17). The mobile router that has received the content response message transmits the content response message to the mobile terminal (S18).

Figure 10:
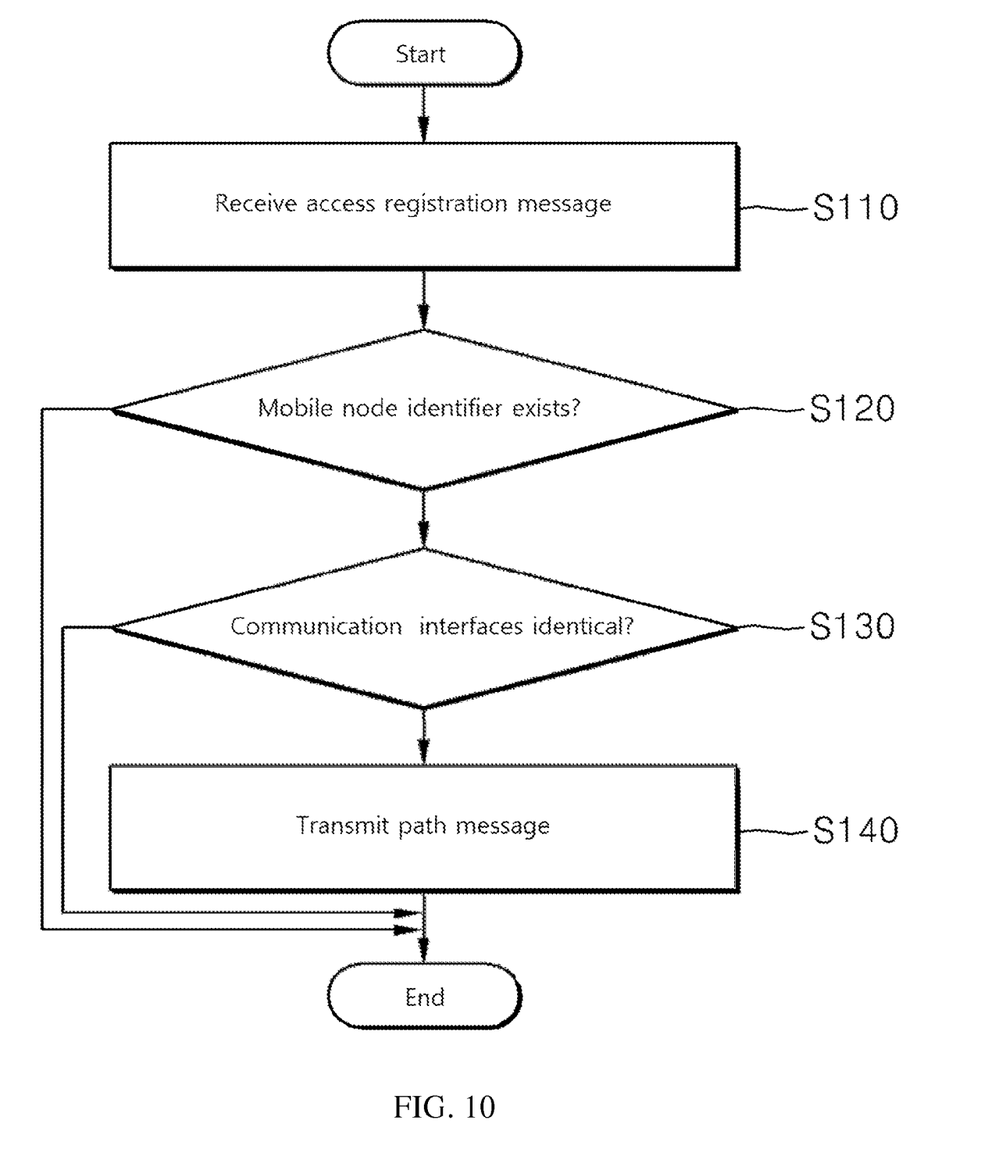
FIG. 10 is a flow chart illustrating a process in which the transmission management agent controls the transmission of a content in the content-centric network in accordance with the present invention.

FIG. 10 is a flow chart illustrating a process in which the transmission management agent controls the transmission of a content in the content-centric network in accordance with the present invention.

Referring to FIG. 10, more specifically, the transmission management agent receives an access registration message including a mobile terminal identifier, a mobile router identifier, information regarding a communication interface between the mobile terminal and the mobile router from the mobile router (S110). The transmission management agent determines whether or not the mobile terminal identifier is previously stored and registered in the management database of the transmission management agent based on the mobile terminal identifier included in the access registration message (S120). If it is determined that the mobile terminal identifier is previously stored and registered in the management database, the transmission management agent determines whether or not a communication interface of the mobile terminal previously registered is matched with a communication interface of the mobile router (S130). If it is determined that a mobile terminal having the same mobile terminal identifier is previously stored and registered in the management database and the communication interface of the mobile terminal previously stored and registered is different from the communication interface of the mobile router, the transmission management agent determines that the mobile terminal has access to the mobile router using the different communication interface while the mobile terminal is moved in a state of having access to the accesss router.

If it is determined that the mobile terminal is moved to the mobile router in a state of having access to the access router, the transmission management agent generates a path message including information regarding the content transmission path between the mobile terminal and the access router, which is previously stored and registered in the management database and transmits the generated path message to the mobile terminal (S140). The mobile terminal generates a content request message including information regarding a content transmission path and the content division identifier and transmits the generated content request message to the mobile router.

Figure 11:
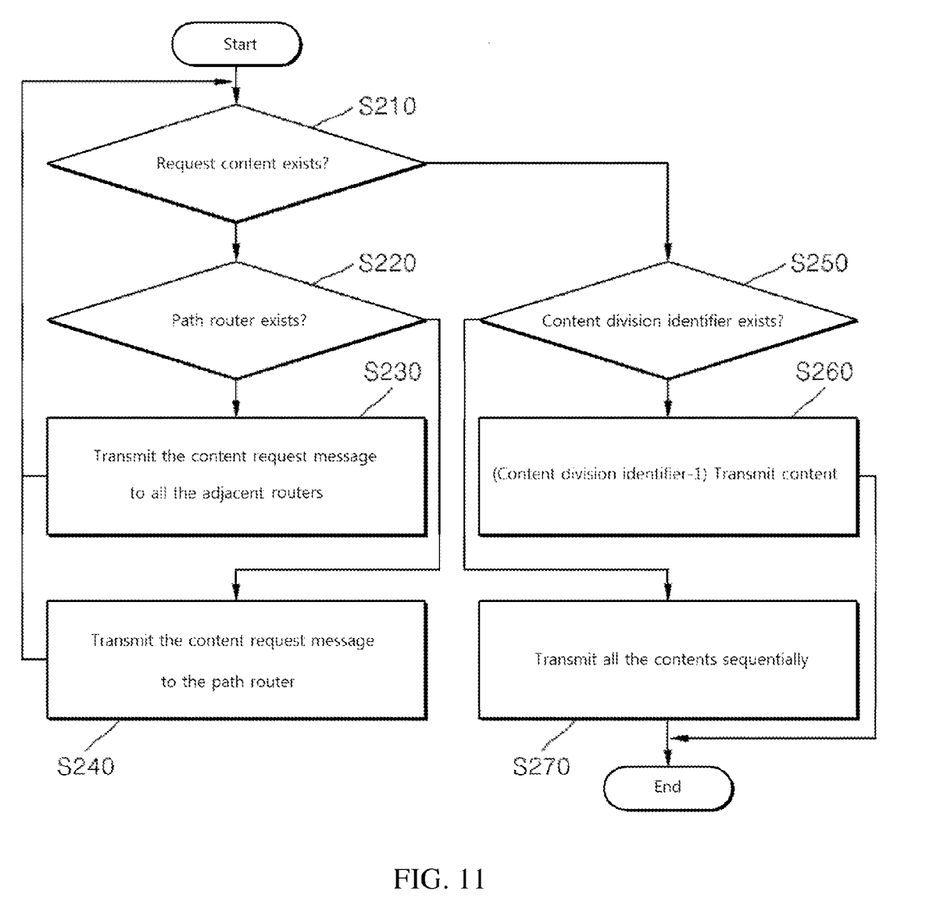
FIG. 11 is a flow chart illustrating a process in which a mobile router or an adjacent router of the mobile router transmits the requested content.

FIG. 11 is a flow chart illustrating a process in which a mobile router or an adjacent router of the mobile router transmits the requested content.

Figure 12:
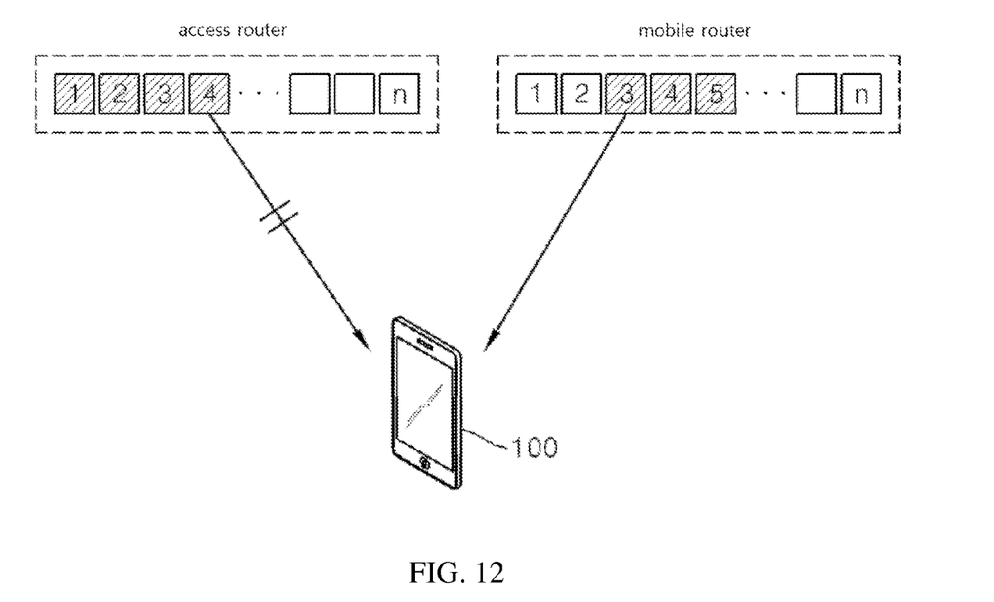
FIG. 12 is a schematic view illustrating one example of the case where the content is transmitted based on a content division identifier in the present invention.

Referring to FIG. 11, more specifically, the mobile router that has received the content request message determines whether or not the requested content is previously stored and registered in the mobile router based on the identifier of the requested content included in the content request message (S210). If it is determined that the requested content is previously stored and registered in the mobile router, the mobile router determines whether or not a content division identifier is included in the content request message (S250). If it is determined that the content division identifier is included in the content request message, the mobile router generates a content response message including the requested content based on the content division identifier and transmits the generated content response message. Preferably, when the mobile terminal is moved while receiving a content corresponding to n-th content division identifier based on the content division identifier, the content division identifier is n and the mobile router transmits a content having a previous content division identifier of the content division identifier, i.e,., an identifier of the content division identifier -1 to the moile terminal (S260). As shown in FIG. 12, if the mobile terminal is moved to a mobile router while receiving a content corresponding to fourth content division identifier in an identifier of the requested content, the mobile router receives the content starting from third content division identifier (4-1) sequentially.

On the contrary, if it is determined at step 5250 that the content division identifier is not included in the content request message, the mobile router transmits all the contents corresponding to the identifier of the requested content to the mobile terminal (S270). The steps S210, S250, S260 and S270 as described above are also performed in adjacent routers that have received the content request message in the same manner as that performed in the mobile router.

On the other hand, if it is determined that the requested content not is previously stored and registered in the mobile router, the mobile router determines whether or not a path router included in the transmission path is present in the adjacent routers of the mobile router based on the transmission path information included in the content request message (S220). If it is determined that the path router is present in the adjacent routers of the mobile router, the mobile router transmits the content request message only to the path router (S240). On the contrary, if it is determined that the path router included in the transmission path is not present in the adjacent routers of the mobile router, the mobile router transmits the content request message to all the adjacent routers (S230).

The steps S210, S220, S230 and S240 as described above are also performed in adjacent routers that have received the content request message in the same manner as that performed in the mobile router.

Figure 13:
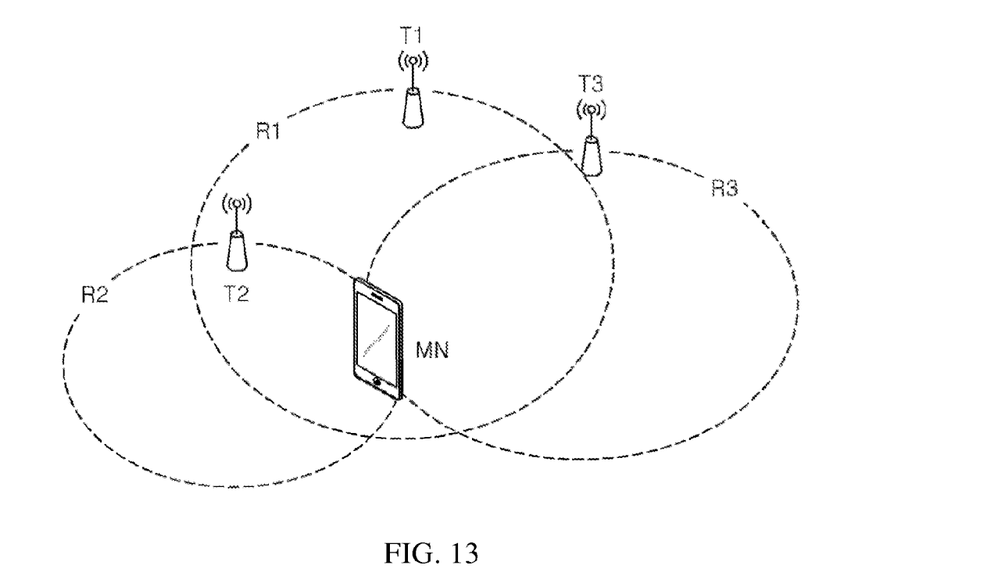
FIG. 13 is a schematic view illustrating one example of a method of selecting a communication interface from among different communication interfaces in the present invention.

Preferably, in the content-centric network in accordance with the present invention, the mobile terminal can have access to the router using a plurality of different communication interfaces, for example, cellular communication interface, the third generation communication interface, the fourth generation communication interface, LTE, WiFi, Bluetooth and the like. As shown in FIG. 13, a mobile terminal MN measures the intensities of signals received from base stations T1, T2 and T3 relaying the respective communication interfaces, and selects a communication interface having the highest data rate based on the measured signal intensities to have access to a router or receive a content. Preferably, the mobile terminal MN selects a communication interface received with the highest signal intensity of the intensities of the received signals as a communication interface having the highest data rate.

Meanwhile, the embodiments of the present invention as described above can be constructed by a program that can be executed in a computer and can be implemented in a universal digital computer that operates the program using a computer-readable recording medium.

The computer-readable recording medium includes a storage medium such as a magnetic storage medium (e.g., ROM, floppy disk, hard disk, or the like), an optical reading medium (e.g., CD-ROM, DVD, or the like), and a carrier wave (e.g., transfer through the Internet).

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

The invention claimed is:

1. A method of transmitting a content to a mobile node in a content-centric network including the mobile node and a plurality of routers, the method comprising the steps of:
    allowing, if the mobile node has access to a mobile router of the plurality of routers, a transmission management agent included in the content-centric network to receive an access registration message from the mobile router;
    allowing the transmission management agent to determine whether or not the mobile node is moved from an access router to which the mobile node has access to the mobile router based on a mobile node identifier, a mobile router identifier, and a communication interface identifier of the mobile node, which are included in the access registration message; and
    allowing, if the mobile node is moved from the access router to the mobile router, the transmission management agent to transmit information regarding a content transmission path between the mobile node and a source router of a source server providing the content to the mobile node.

2. The method according to claim 1, wherein the step of allowing determining whether or not the mobile node is moved from the access router to the mobile router comprises the steps of:
    determining whether or not the mobile node has access to the access router based on whether or not a mobile node identifier that is the same as the mobile node identifier is previously stored and registered in a management database of the transmission management agent;

comparing, if it is determined that mobile node has access to the access router, an identifier of a communication interface between the mobile node and the access router with an identifier of a communication interface between the mobile node and the mobile router; and determining, if it is determined that the identifier of a communication interface between the mobile node and the access router is different from the identifier of a communication interface between the mobile node and the mobile router, that the mobile node is moved from access router to the mobile router.

3. The method according to claim 2, wherein the transmission management agent receives information regarding a content transmission path between the mobile node and the source router from the access router, and stores and registers the mobile node identifier, the mobile router identifier, the communication interface identifier of the mobile node, and the information regarding the content transmission path, which are included in the access registration message, in the management database.

4. The method according to claim 2, wherein the mobile node that has received the information regarding the content transmission path transmits a content request message including the information regarding the content transmission path to the mobile router, and the mobile router or an adjacent router of the mobile router determines whether or not a path router included in the transmission path is present in an adjacent router of the mobile router or adjacent routers of the adjacent router based on the transmission path information.

5. The method according to claim 4, wherein if a plurality of adjacent routers is present in the mobile router or the adjacent router, the mobile router or the adjacent router transmits the content request message to the path router included in the transmission path of the plurality of adjacent routers based on the transmission path information.

6. A method of transmitting a content to a mobile node in a content-centric network, the method comprising the steps of:
(a) allowing a transmission management agent to determine whether or not the mobile node is moved from an access router to a mobile router, and transmit information regarding a content transmission path between the mobile node and a source router providing the content to the mobile node;
(b) allowing the mobile node to transmit information regarding the content transmission path and a content request message including an identifier of the requested content to the mobile router; and
(c) allowing the mobile router to determine whether or not a path router included in the content transmission path is present in the adjacent routers of the mobile router based on the information regarding the content transmission path, and re-transmit the content request message to the path router.

7. The method according to claim 6, wherein the step of re-transmitting the content request message comprises the steps of:
allowing the mobile router to determine whether or not the requested content exists in a registration content list of the access router based on the identifier of the requested content included in the content request message; and
allowing, if it is determined that the requested content does not exist in a registration content list of the access router, the mobile router to determine whether or not a path router included in the content transmission path is present in the adjacent routers of the mobile router based on the information regarding the content transmission path; and allowing, if it is determined that the path router included in the content transmission path is present in the adjacent routers of the mobile router, the mobile router to re-transmit the content request message to the path router.

8. The method according to claim 7, wherein if it is determined that the path router included in the content transmission path is not present in the adjacent routers of the mobile router, the mobile router re-transmits the content request message to all the adjacent routers of the mobile router.

9. The method according to claim 8, wherein the adjacent routers that have received the content request message performs the steps of:
determining whether or not the requested content exists in a registration content list of the adjacent routers based on the identifier of the requested content included in the content request message;
determining, if it is determined that requested content does not exist in the registration content list, whether or not a path router included in the content transmission path is present in second adjacent routers of the adjacent router based on the information regarding the content transmission path; and
re-transmitting, if it is determined that the path router included in the content transmission path is present in the second adjacent routers, the content request message to the path router, and re-transmitting, if it is determined that the path router included in the content transmission path is not present in the second adjacent routers, the content request message to all the second adjacent routers of the adjacent router.

10. The method according to claim 7, wherein the mobile node selects a communication interface having the highest data rate from among the communication interfaces between the mobile node and the mobile router, and transmits the content request message to the mobile router through the selected communication interface or receives a content response message including the requested content from the mobile router.

11. The method according to claim 10, wherein the mobile node selects a communication interface with the highest signal intensity as a communication interface having the highest data rate based on the signal intensities of the respective communication interfaces between the mobile node and the mobile router.

12. The method according to claim 7, wherein the content request message comprises a division identifier of a content that has been transmitted to the mobile node, and the path router included in the content transmission path transmits the content to the mobile terminal through the mobile router, starting from a content corresponding to a previous division identifier of the content based on the content division identifier.

13. The method according to claim 9, wherein the content request message comprises a division identifier of a content that has been transmitted to the mobile node, and the path router included in the content transmission path transmits the content to the mobile terminal through the mobile router, starting from a content corresponding to a previous division identifier of the content based on the content division identifier.

* * * * *